United States Patent
Futa, Jr. et al.

(10) Patent No.: US 6,751,939 B2
(45) Date of Patent: Jun. 22, 2004

(54) FLOW DIVIDER AND ECOLOGY VALVE

(75) Inventors: Paul W. Futa, Jr., North Liberty, IN (US); Dennis G. Demers, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 35 days.

(21) Appl. No.: 10/179,783

(22) Filed: Jun. 25, 2002

(65) Prior Publication Data

US 2003/0233823 A1 Dec. 25, 2003

(51) Int. Cl.$^7$ ................................................ F02C 7/232
(52) U.S. Cl. ...................................... 60/39.094; 60/739
(58) Field of Search ...................... 60/39.094, 39.281, 60/734, 739

(56) References Cited

U.S. PATENT DOCUMENTS

| | | |
|---|---|---|
| 395,625 A | 1/1889 | Moore |
| 2,268,227 A | 12/1941 | Rose |
| 3,113,591 A | 12/1963 | Neuman et al. |
| 3,596,676 A | 8/1971 | Kraakman |
| 3,723,025 A | 3/1973 | Coakley |
| 4,027,474 A | 6/1977 | Demase |
| 4,041,695 A | 8/1977 | Harper et al. |
| 4,133,349 A | 1/1979 | Stripling |
| 4,185,663 A | 1/1980 | Stripling |
| 4,192,337 A | 3/1980 | Alderson et al. |
| 4,531,536 A | 7/1985 | Kosarzecki |
| 4,719,749 A | 1/1988 | Greune et al. |
| 4,739,795 A | 4/1988 | Ewbank et al. |
| 5,579,806 A | 12/1996 | Bewsky |
| 5,809,771 A | 9/1998 | Wernberg |
| 5,971,012 A | 10/1999 | Skoglund |
| 6,195,978 B1 * | 3/2001 | Futa ........................ 60/39.094 |
| 6,314,998 B1 | 11/2001 | Futa, Jr. et al. |

* cited by examiner

Primary Examiner—Louis J. Casaregola
(74) Attorney, Agent, or Firm—Larry J. Palguta

(57) ABSTRACT

A fuel flow dividing ecology valve conveys fuel from a fuel source to at least a secondary gas turbine engine intake manifold during engine operation and withdraws fuel therefrom upon cessation of engine operation. The valve includes a flow dividing valve portion having an inlet coupled to the fuel source and an outlet coupled to the secondary manifold. The valve also includes an ecology valve portion controlled by the fuel pressure differential between the fuel source and the flow restricting inlet. The ecology valve portion includes a housing with a movable piston disposed therein. The piston defines, in conjunction with the housing, a variable volume chamber for withdrawing fuel from the engine intake manifolds. When the engine is de-energized, the piston moves from a first position toward a second position thereby purging the manifolds of fuel.

18 Claims, 5 Drawing Sheets

FLOW DIVIDER AND ECOLOGY VALVE

BACKGROUND OF THE INVENTION

1. Field of the Invention

The present invention relates to fuel supply systems and more particularly to a flow divider and ecology valve for supplying fuel to an engine manifold and withdrawing fuel therefrom upon engine shut-down.

2. Description of the Related Art

Gas turbine engine fuel delivery systems may require multiple fuel manifolds and an arrangement for apportioning fuel flow among those manifolds to segregate various types of fuel nozzles for optimal engine performance. For example, U.S. Pat. No. 5,809,771 to Wernberg discloses a fuel flow splitting valve having a single piston operable in two different regions, one for modulating flow to primary and secondary engine nozzles as a function of fuel pressure and another where flow to primary and secondary engine nozzles is determined by the fixed port geometry. Also, some engines may require an ecology function that removes a set quantity of fuel from the engine fuel manifold(s) upon cessation of engine operation. Fuel removal is required to keep fuel from vaporizing into the atmosphere and to avoid fuel coking on the engine's fuel nozzles, a condition that hinders nozzle performance. Prior art ecology systems have used an arrangement of pistons, check valves, plumbing, reservoirs and pumps to accomplish this task. In engines requiring multiple fuel manifolds, multiple ecology valves or a multiple chambered ecology valve have been used. A two chambered valve is disclosed in the abovementioned Wernberg patent. In the Wernberg system, fuel is simultaneously withdrawn from the two manifolds and a separate chamber is required for each engine manifold to ensure complete fuel removal from those manifolds upon engine shut-down. These types of architecture result in complex high cost and weight ecology systems.

It is desirable to minimize the fuel remaining in an engine intake manifold upon cessation of engine operation and to provide a compact, economical ecology function for fuel supply systems. It is also desirable to achieve such an ecology function by employing a simple valve which is controlled solely by fuel flow to the manifold(s) involved. It is further desirable to provide both an ecology function and a fuel flow dividing function in a common simplistic valve mechanism.

SUMMARY OF THE INVENTION

The present invention provides solutions to the above considerations in the form of an ecology and flow divider valve module consisting of a flow shutoff and pressurizing valve assembly, and an ecology valve (piston reservoir) assembly, packaged on a common centerline, in a common body. In another form, the module includes a flow apportioning valve downstream of the shutoff and pressurizing valve.

The invention comprises, in one form thereof, a fuel flow dividing ecology valve for selectively conveying fuel from a fuel source to at least a secondary gas turbine engine intake manifold during engine operation and withdrawing fuel therefrom upon cessation of engine operation which includes a flow dividing portion and an ecology valve portion. The flow dividing valve portion has an inlet coupled to the fuel source and an outlet coupled to the secondary manifold, the flow dividing valve portion transitions from a fuel flow blocking condition to a condition in which fuel may flow from the source to the manifold solely in response to the fuel pressure differential between the inlet and the outlet. The ecology valve portion is controlled solely by the fuel pressure differential between the dividing valve portion inlet and outlet for withdrawing fuel from the secondary engine intake manifold when the engine is de-energized thereby purging the manifold of fuel, and returning withdrawn fuel to the manifold during subsequent engine operation.

Also in general, and in one form of the invention, a fuel flow dividing valve for selectively conveying fuel from a fuel source to at least a primary gas turbine engine intake manifold and a secondary gas turbine engine intake manifold during engine operation includes a pressure differential actuated flow dividing valve portion having a movable valve spool with a flow restricting inlet and first and second substantially unrestricted outlets. The first outlet is coupled to the inlet and is independent of valve condition for supplying fuel to the primary manifold. The second outlet is coupled to the inlet for supplying fuel to the secondary manifold only when the pressure differential across the flow restriction exceeds a threshold. An ecology valve portion is controlled solely by the fuel pressure differential between the fuel source and the flow restricting inlet for withdrawing fuel first from the secondary engine intake manifold and subsequently from the primary engine intake manifold when the engine is de-energized thereby purging both manifolds of fuel, and returns withdrawn fuel to the manifolds during subsequent engine operation.

An advantage of the present invention is that the flow splitter valve is nested axially within the ecology valve, which conserves size, weight, and complexity.

Another advantage of the present invention is that ecology valve is controlled solely by fuel flow to and the pressure differential across the flow splitter valve.

BRIEF DESCRIPTION OF THE DRAWINGS

Corresponding reference characters indicate corresponding parts throughout the several drawing views.

DETAILED DESCRIPTION OF THE INVENTION

Figure 1:
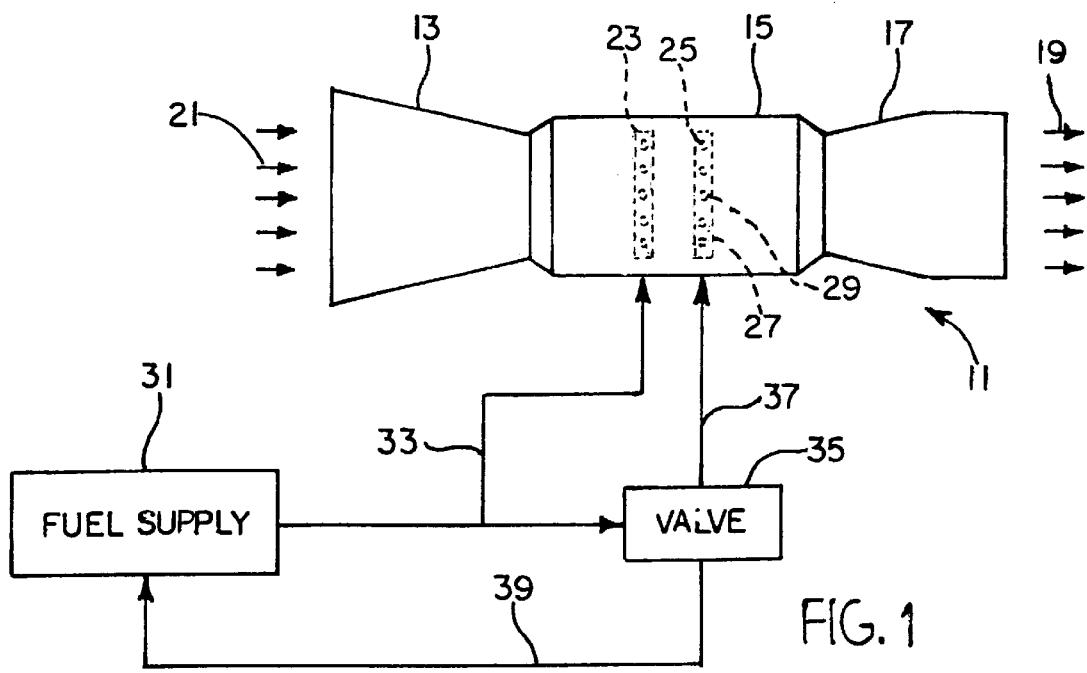
FIG. 1 is a general schematic illustration of a fuel supply system incorporating the present invention in one form.

Referring now to the drawings and particularly to FIG. 1, there is shown a fuel supply system for a gas turbine engine 11 having, for example, an air inlet compressing section 13, a combustion region 15 and a turbine section 17. Combustion products exiting the engine are illustrated at 19 and incoming air is shown at 21. Combustion region 15 may include fuel intake manifolds such as a primary manifold 23 and a secondary manifold 25 with nozzles such as 27 and 29 for introducing fuel into the combustion region. The manifolds may, for example, be generally annular hollow structures with the nozzles distributed about the inner annular surfaces. Fuel is supplied to the manifolds from a fuel source 31 which may include conventional pump, metering valve, pressurizing valve, bypass valves and flow meter as desired. Fuel flow from source 31 to the primary manifold 23 is directly by way of line 33 while fuel flows through a valve 35 on its way to secondary manifold 25. A low pressure fuel return 39 may be included. Valve 35 is shown in greater detail in FIG. 2.

Figure 2:
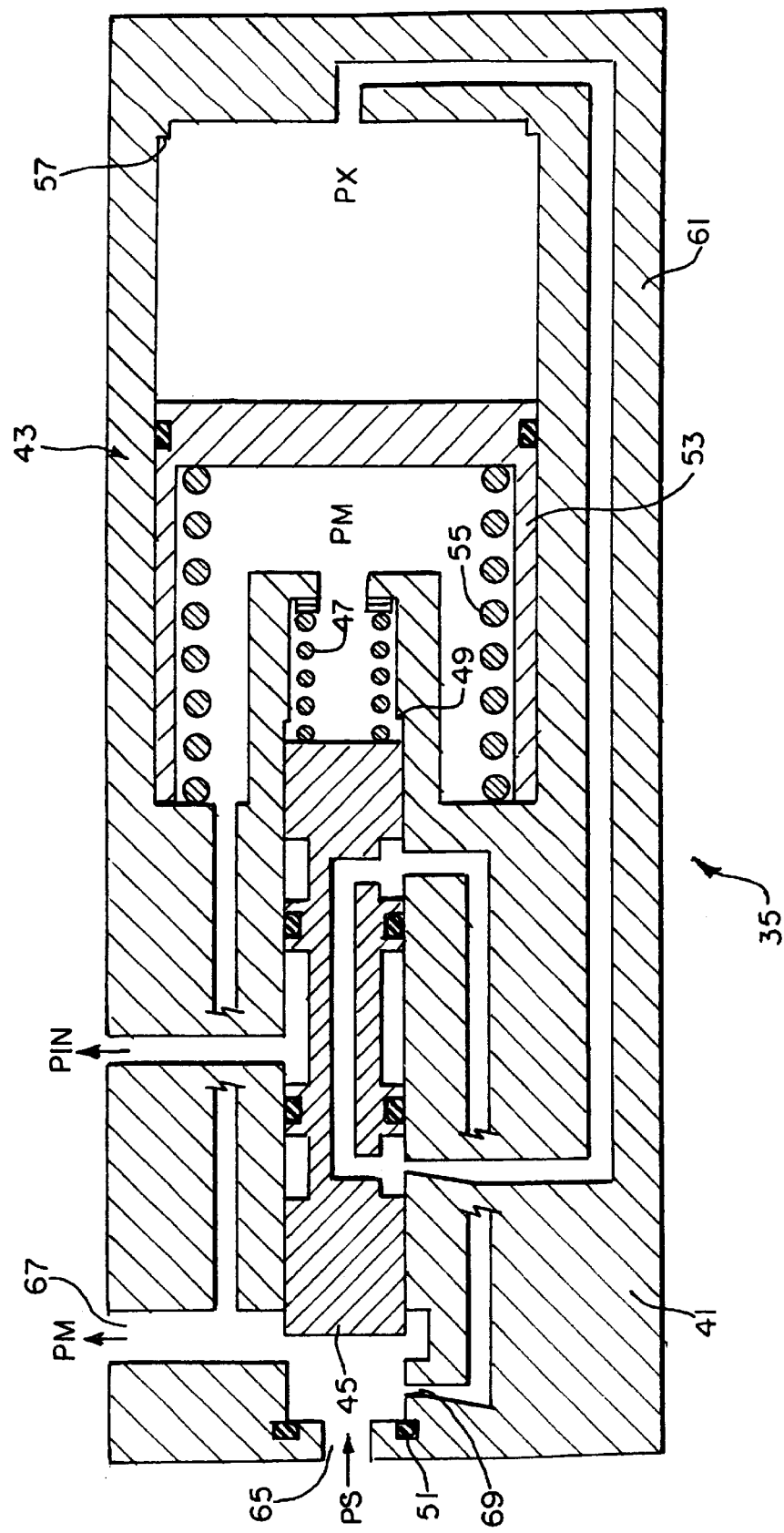
FIG. 2 is a detailed schematic illustration of the fuel divider and ecology valve of FIG. 1 shown in the engine-running configuration.
Figure 3:
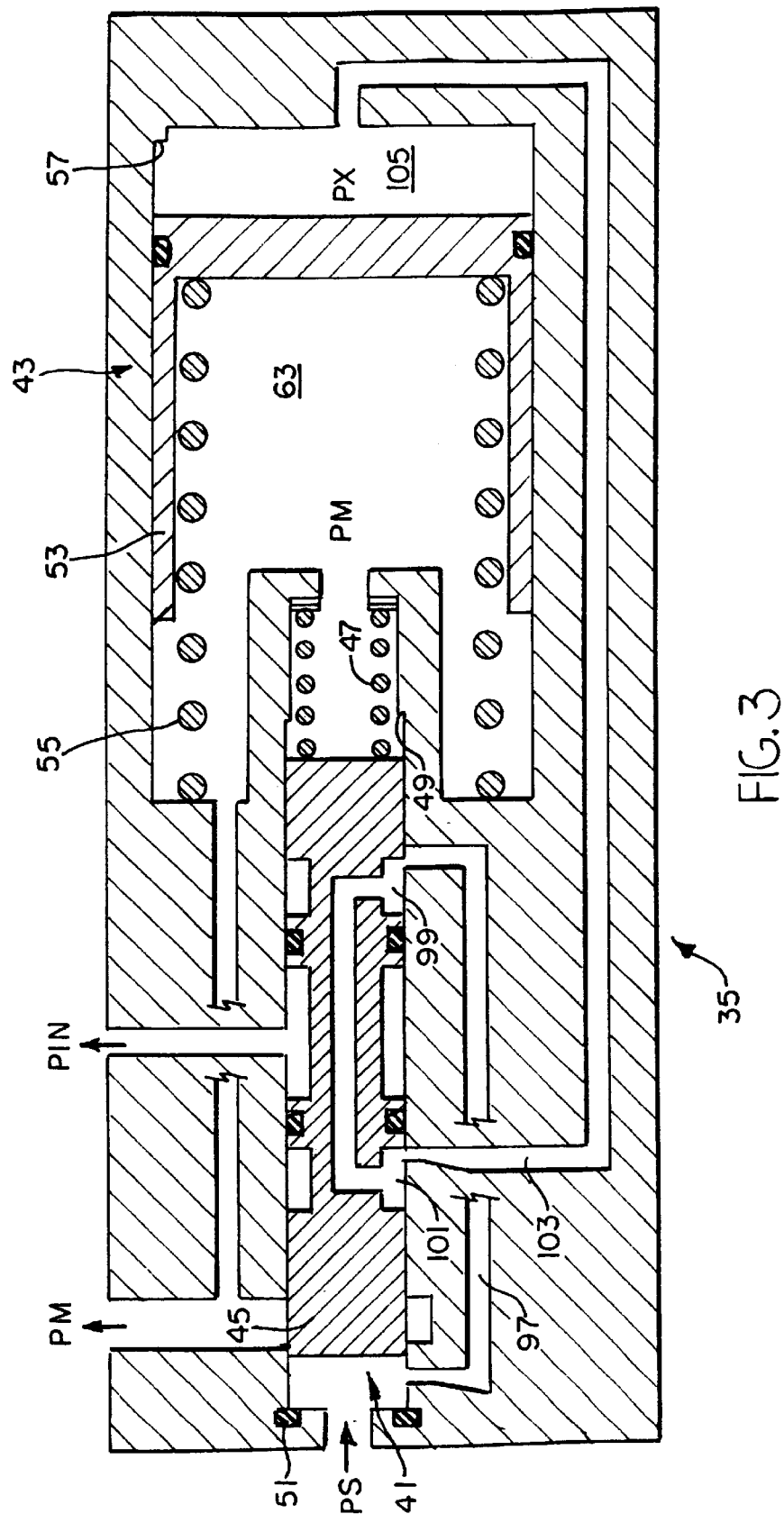
FIG. 3 is a detailed schematic illustration of the fuel divider and ecology valve of FIG. 1 shown in the engine start-up configuration.
Figure 4:
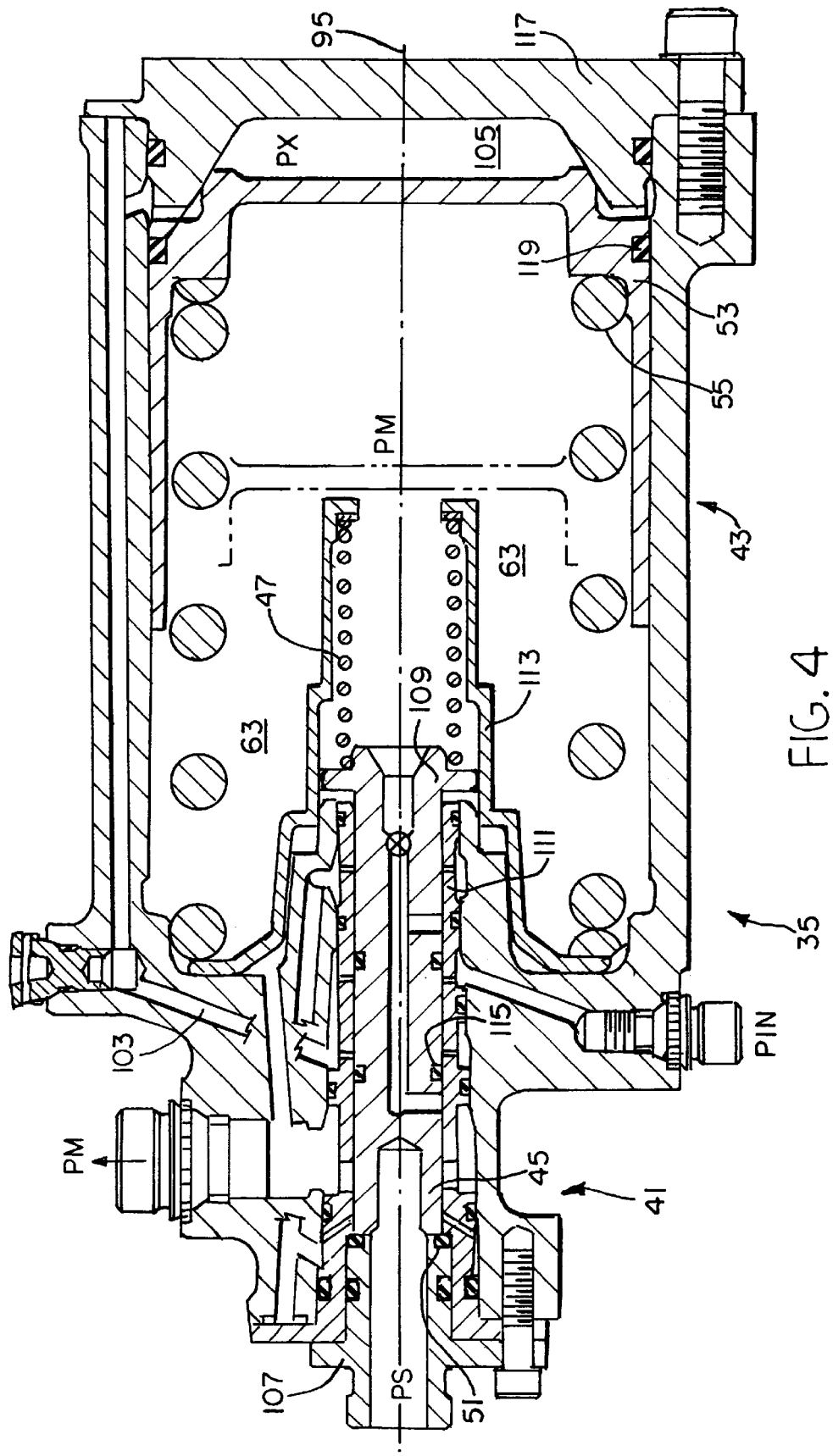
FIG. 4 is a cross-sectional view of the valve of FIGS. 2 and 3 in the engine off configuration.

In FIG. 2, the valve 35 is seen to include an ecology valve portion 43 located within a housing 61 having a generally cylindrical piston 53 reciprocably disposed therein for movement between a first extreme position as shown in FIG. 2, and a second extreme position where the piston engages a shoulder 57 as illustrated in FIG. 4. Between the piston and housing there is formed a variable volume chamber 63 for withdrawing fuel from the secondary engine intake manifold 25 when the engine is de-energized and the piston moves from the first extreme position rightwardly under the urging of spring 55 toward the second extreme position to purge the manifold 25 of fuel. Valve 35 also includes a flow dividing valve portion 41 which has an inlet port 65 for receiving fuel at source pressure PS from the source 31, an outlet port 67 for conveying fuel at pressure PM to the secondary manifold 25 and a control port 69 for supplying an actuating pressure PX to the ecology valve portion 43. Valve portion 41 has a generally cylindrical valve spool 45 movable between a first extreme leftward position shown in FIG. 4 in which the spool closes the inlet port and a second extreme position where piston 45 engages shoulder 49 allowing fuel flow from the inlet port 65 to the outlet port 67. Further, there is an initial incrementally open position shown in FIG. 3 where a fuel flow path is provided from the inlet port 65 to the control port 69 while precluding fuel flow from the inlet port to the outlet port.

Referring primarily to FIG. 3, the valve spool 45 is resiliently biased toward the left or closed position by spring 47. The ecology valve piston 53 is resiliently biased by spring 55 toward the second or extreme rightward position and is movable from the second position leftward toward the first or FIG. 2 position due to urging provided by the control pressure PX to return fuel from chamber 63 to the secondary manifold. Fuel is expelled from chamber 63 by leftward piston movement through outlet port 67 caused by an increase in fuel pressure at the flow dividing valve portion inlet port 65. through port 69, conduit 97, valve spool grooves 99 and 101 and housing conduit 103 to the chamber 105.

In FIG. 4, the secondary flow shutoff and pressurizing valve portion 41 is seen to consists of a combination inlet fitting soft seat retainer 107, a matched valve 109 and sleeve 111, a spring 47 with shims, and a spring retainer 113 held in place with the ecology valve spring 55. The secondary flow shutoff and pressurizing valve portion 41 performs three functions. First, it incorporates a fluorocarbon 'o' ring soft seat, and Teflon cap seals energized by fluorosilicone 'o' rings, as shown at 51 to obtain drip tight leakage control. Second, it controls the position of the ecology valve portion 43 (energized or purged) based on it's relative position with respect to integral porting between it's valve spool and sleeve. Third, it controls the pressure delta where metered flow is allowed to flow to the secondary engine manifold. One of the cap seals 115 translates over the PX port.

The ecology valve assembly 43 consists of a cover 117, a spring 55, and an unsleeved piston 53. A Teflon cap seal energized by a fluorosilicone 'o' ring 119 controls leakage across the piston. This piston performs the function of collecting a set amount of fuel from the secondary flow manifold upon engine cessation. The stored fuel is returned to the secondary flow manifold during the following engine run cycle. The valve spool 45 and piston 53 are both generally cylindrical and movable along a common axis 95.

In FIGS. 2–4, when the shutoff and pressurizing valve 41 is closed (against the soft seat), PS (flow divider inlet pressure at inlet port 65) is blocked from the PM (secondary flow manifold pressure at outlet port 67), with it's switching function connecting PX (ecology valve control pressure) by way of line 103 and the center spool groove to low PIN (pump inlet pressure) via line 39. The ecology valve is thereby in it's fully purged position, retracting the set amount of fuel from the secondary flow manifold into the spring cavity (reservoir 63) of the valve. This is the engine off position for the valves. As PS pressure increases at port 65, the pressurizing valve spool 45 moves rightwardly to the PS/PM near open or cracking position shown in FIG. 3, and it's switching function connects PX pressure to PS pressure through control port 69, conduit 97, valve spool groove 99, axially along the spool to groove 101, and housing conduit 103 to the chamber 105. At this position, the PS/PM flow path remains blocked, leaving the pressure in the secondary flow manifold (as well as the spring side of the ecology valve) low. This causes the ecology valve to travel toward its energized position, returning the stored fuel from the spring side of the valve to the secondary flow manifold. The shutoff and pressurizing valve portion 41 remains more or less stationary up to the time that the ecology valve reaches its hard stop fully energized position. In this position, the secondary flow manifold has been refilled with the volume of fuel stored in the ecology valve. When the ecology valve is fully energized, PX pressure gets dead headed, and PM pressure now continues to rise. At this point, the pressurizing valve moves to the PS/PM cracking position, allowing secondary burn flow to the engine. The shutoff and pressurizing valve further opens the PS/PM flow path as pressure differential increases as shown in FIG. 2. It should be noted that during all engine run conditions, the ecology valve is in its full energized position against the respective hard stop, making the ecology valve a non-dynamic feature with respect to secondary metered burn flow to the engine. Upon engine cessation, this sequence of events occur in the reverse order, thereby purging the secondary flow manifold of the set amount of fuel.

Figure 5:
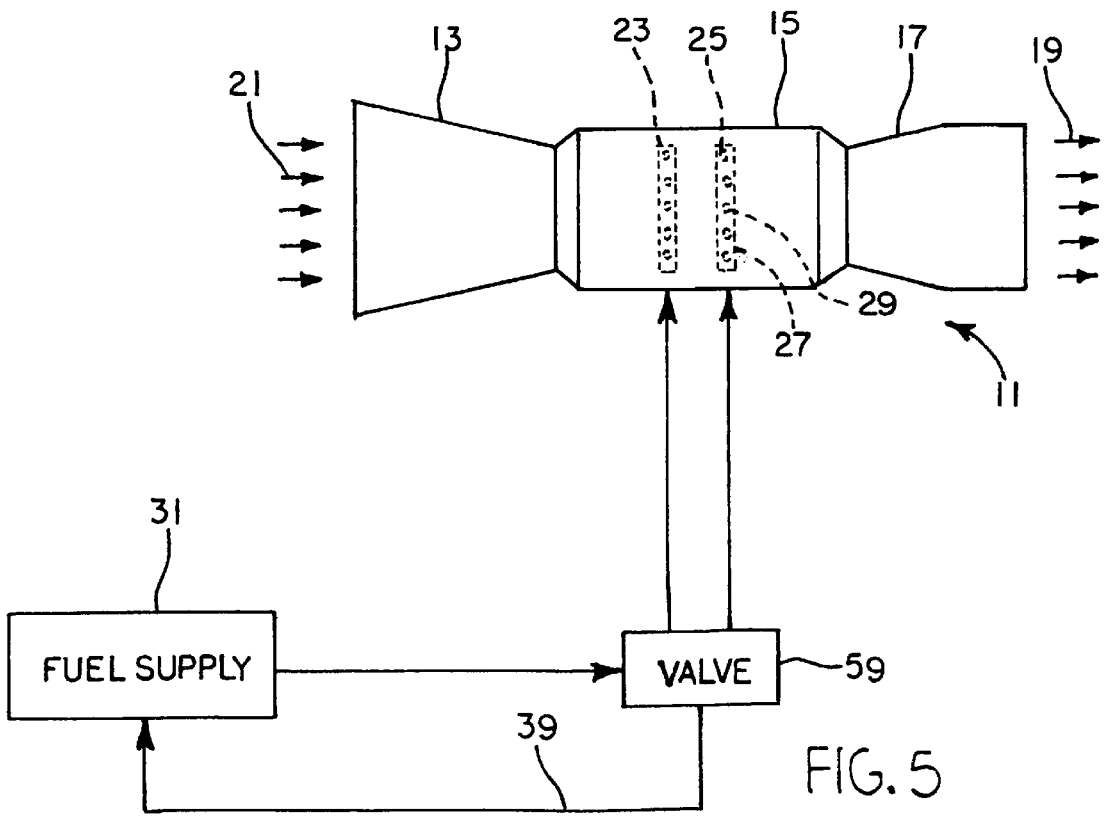
FIG. 5 is a general schematic illustration of a fuel supply system incorporating the present invention in an alternate form.
Figure 6:
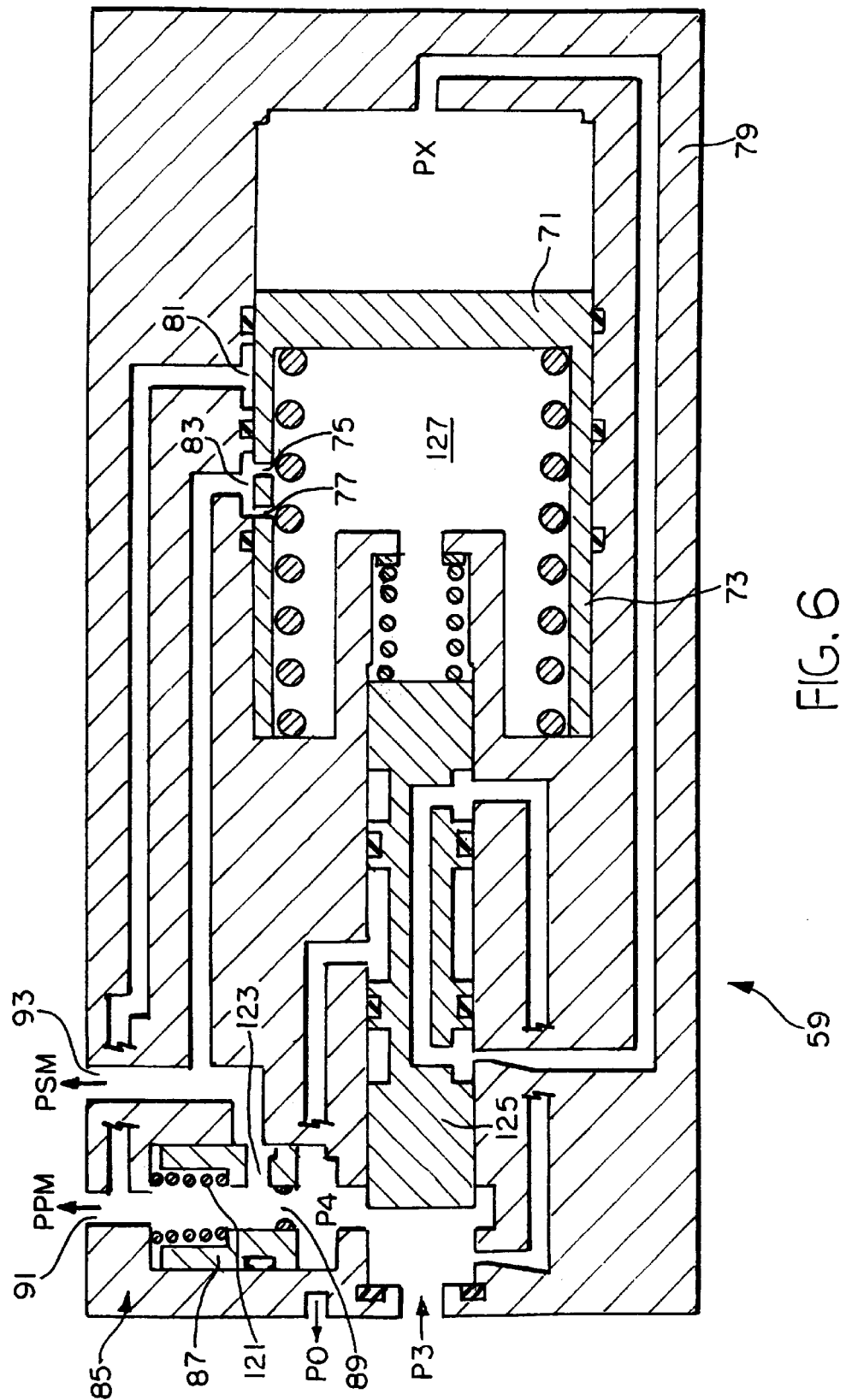
FIG. 6 is a schematic illustration of the form of a fuel divider and ecology valve shown in FIG. 5.

In FIGS. 1–4, valve 35 selectively conveys fuel from the fuel source exclusively to the secondary gas turbine engine intake manifold 25 during engine operation and withdraws fuel exclusively therefrom upon cessation of engine operation. Purging of the primary manifold, if employed, is by a separate ecology valve, expelling fuel under air pressure to be burned in the combustion region, or other known technique. In FIGS. 5 and 6, however, fuel flow is from the supply 31 to a valve 59 and then from valve 59 to both primary 23 and secondary 25 manifolds. This facilitates purging of the primary as well as the secondary manifold upon engine shut-down. In FIG. 5, the engine 11, fuel supply 31 and low pressure return line 39 are substantially as previously described, however, both the primary 23 and secondary 25 manifolds now receive fuel by way of the valve 59 which is shown in greater detail in FIG. 6.

In FIG. 6, the ecology valve portion piston 71 includes a generally hollow cylindrical sidewall 73 having sidewall apertures 75 and 77 and the housing 79 has first and second axially spaced ports 81 and 83. The first port 81 provides a fuel flow path between the variable volume chamber 127 and the primary manifold by way of outlet port 91 while the second port 83 provides a fuel flow path between the variable volume chamber and the secondary manifold by way of outlet port 93.

Further, FIG. 6 includes a pressure differential actuated flow dividing valve 85 which has a movable valve spool 87 with a flow restricting inlet 89 and first (primary manifold pressure PPM) outlet 91 and second (secondary manifold pressure PSM) outlet 93, both of which are substantially unrestricted outlets. Outlet 91 is coupled to the inlet 89 (and pressure P4) through the central axial spool path independent of valve condition for supplying fuel to the primary manifold while the secondary manifold outlet 93 is coupled to the inlet 89 for supplying fuel to the secondary manifold when the pressure differential across the flow restriction 89 exceeds a threshold and the spool moves upwardly against the urging of spring 121. This movement aligns a movable spool sidewall port 123 with a housing opening which connects to outlet port 93. The spool 125 functions, as did spool 45, in response to inlet pressure P3 to move rightwardly initially connecting inlet pressure P3 as control pressure PX to the right face of piston 71 returning previously purged fuel sequentially first to the primary manifold 23 by way of piston skirt aperture 77 and ports 81 and 91, and subsequently to the secondary manifold 25 by way of piston skirt aperture 77 and ports 83 and 93. The low pressure return which connects to line 39 is indicated as P0.

FIG. 6 shows valve 59 in the engine running configuration with the valve 85 conveying fuel from the fuel source to both primary 23 and secondary 25 gas turbine engine intake manifolds. When the engine is shut down, fuel is first withdrawn from manifold 25 by way of ports 93 and 83 through apertures 75 and 77 into the variable volume ecology valve chamber 127. Then fuel is withdrawn from manifold 23 by way of ports 91 and 81 through apertures 75 and 77 into the variable volume ecology valve chamber 127. Thus, the fuel withdrawn from the primary and secondary manifolds is commingled in chamber 127 prior to returning fuel to the two manifolds upon subsequent engine energization. Also, withdrawal of fuel from the primary manifold commences before withdrawal of fuel from the secondary manifold is completed. This slight overlap is intentional to avoid potential valve lock-up and occurs when piston 71 is in position where aperture 75 aligns with port 81 and aperture 77 aligns with port 83.

What is claimed is:

1. A fuel flow dividing ecology valve for selectively conveying fuel from a fuel source to at least a secondary gas turbine engine intake manifold during engine operation and withdrawing fuel therefrom upon cessation of engine operation, comprising:
an ecology valve portion including a housing, and a piston disposed therein and movable between first and second extreme positions, the piston defining, in conjunction with the housing, a variable volume chamber for withdrawing fuel from the secondary engine intake manifold when the engine is de-energized and the piston moves from the first extreme position toward the second extreme position thereby purging the manifold of fuel; and
a flow dividing valve portion having an inlet port for receiving fuel from the source, an outlet port for conveying fuel to the manifold, a control port for supplying an actuating pressure to the ecology valve portion, and a valve spool movable between a first extreme position in which the spool closes the inlet port, a second extreme position allowing fuel flow from the inlet port to the outlet port, and an initial incrementally open position providing a fuel flow path from the inlet port to the control port while precluding fuel flow from the inlet port to the outlet port.

2. The valve of claim 1, wherein the ecology valve piston is resiliently biased toward the second position.

3. The valve of claim 2, wherein the ecology valve piston is movable from the second position toward the first position to return fuel to the secondary manifold.

4. The valve of claim 3, wherein movement of the ecology valve piston from the second position toward the first position is caused by an increase in fuel pressure at the flow dividing valve portion inlet port.

5. The valve of claim 1, wherein valve selectively conveys fuel from the fuel source exclusively to the secondary gas turbine engine intake manifold during engine operation and withdraws fuel exclusively therefrom upon cessation of engine operation.

6. The valve of claim 1, wherein the valve selectively conveys fuel from the fuel source to both a primary and a secondary gas turbine engine intake manifold during engine operation, and withdraws fuel from both manifolds upon cessation of engine operation.

7. The valve of claim 6, wherein fuel is withdrawn sequentially first from the secondary manifold and then from the primary manifold.

8. The valve of claim 7, wherein fuel withdrawal from the primary manifold commences before withdrawal of fuel from the secondary manifold is completed.

9. The valve of claim 6, wherein the valve returns withdrawn fuel during subsequent engine operation first to the primary manifold and subsequently to the secondary manifold.

10. The valve of claim 9, wherein the fuel withdrawn from the primary and secondary manifolds is comingled prior to returning fuel to the two manifolds.

11. The valve of claim 6, wherein the piston includes a generally hollow cylindrical sidewall having at least one aperture and the housing has first and second axially spaced ports, the first port providing a fuel flow path between the variable volume chamber and the primary manifold, and the second port providing a fuel flow path between the variable volume chamber and the secondary manifold.

12. The valve of claim 6, further including a pressure differential actuated flow dividing valve having a movable valve spool with a flow restricting inlet and first and second substantially unrestricted outlets, the first outlet coupled to the inlet independent of valve condition for supplying fuel to the primary manifold, and the second outlet coupled to the inlet for supplying fuel to the secondary manifold when the pressure differential across the flow restriction exceeds a threshold.

13. The valve of claim 1, wherein the valve spool and piston are both generally cylindrical and movable along a common axis.

14. A fuel flow dividing ecology device for selectively conveying fuel from a fuel source to at least a secondary gas turbine engine intake manifold during engine operation and withdrawing fuel therefrom upon cessation of engine operation, comprising:
a flow dividing valve portion having an inlet coupled to the fuel source and an outlet coupled to the secondary manifold, the flow dividing valve portion transitioning from a fuel flow blocking condition to a condition in which fuel may flow from the source to the manifold based on a movable member within the flow dividing valve portion; and an ecology valve portion controlled by the position of the movable member relative to the flow dividing valve portion for withdrawing fuel from the secondary engine intake manifold when the engine is de-energized thereby purging the manifold of fuel, and returning withdrawn fuel to the manifold during subsequent engine operation.

15. The device of claim 14, wherein the device selectively conveys fuel from the fuel source exclusively to the secondary gas turbine engine intake manifold during engine operation and withdraws fuel exclusively therefrom upon cessation of engine operation.

16. The device of claim 14, wherein the device selectively conveys fuel from the fuel source to both a primary and a secondary gas turbine engine intake manifold during engine operation, and withdraws fuel from both manifolds upon cessation of engine operation.

17. The device of claim 16, wherein fuel is withdrawn sequentially first from the secondary manifold and then from the primary manifold.

18. The device of claim 14, wherein, when the flow dividing portion transitions to the condition in which fuel may flow from the source to the manifold, the flow dividing valve portion is configured such that the position of the movable member relative to the flow dividing valve portion creates a fuel pressure differential between the inlet and the outlet that determines an actuating pressure applied to the ecology valve portion, the fuel pressure differential being created.

* * * * *